United States Patent
Suhre et al.

(10) Patent No.: US 6,360,724 B1
(45) Date of Patent: Mar. 26, 2002

(54) METHOD AND APPARATUS FOR CONTROLLING THE POWER OUTPUT OF A HOMOGENOUS CHARGE INTERNAL COMBUSTION ENGINE

(75) Inventors: Blake R. Suhre; Jeffery C. Ehlers, both of Neenah, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/574,159

(22) Filed: May 18, 2000

(51) Int. Cl.[7] .............................................. F02D 17/02
(52) U.S. Cl. ................................... 123/481; 123/198 F
(58) Field of Search ...................... 123/198 F, 198 DC, 123/198 DB, 325, 330, 332, 334, 481, 406.23, 406.24, 295

(56) References Cited

U.S. PATENT DOCUMENTS

| | | | |
|---|---|---|---|
| 4,550,703 A | 11/1985 | Ootuka et al. ............... 123/478 |
| 5,377,631 A | 1/1995 | Schechter ................... 123/198 |
| 5,408,974 A * | 4/1995 | Lipinski et al. ............. 123/481 |
| 5,431,139 A * | 7/1995 | Grutter et al. ............ 123/198 F |
| 5,553,575 A | 9/1996 | Beck et al. .................. 123/198 |
| 5,685,277 A * | 11/1997 | Pallett et al. ................ 123/481 |
| 5,692,471 A * | 12/1997 | Zhang ........................ 123/350 |
| 5,778,858 A | 7/1998 | Garabedian .................. 123/481 |
| 5,826,563 A * | 10/1998 | Patel et al. .................. 123/481 |
| 5,827,150 A * | 10/1998 | Mukumoto .................. 477/101 |
| 5,970,951 A * | 10/1999 | Ito .............................. 123/335 |
| 6,135,095 A * | 10/2000 | Motose et al. .............. 123/481 |
| 6,209,526 B1 * | 4/2001 | Sun et al. .................... 123/481 |
| 6,244,242 B1 * | 6/2001 | Grizzle et al. ............... 123/295 |

* cited by examiner

Primary Examiner—Willis R. Wolfe
Assistant Examiner—Hai H. Huynh
(74) Attorney, Agent, or Firm—William D. Lanyi

(57) ABSTRACT

A control method and apparatus for regulating the power output of an engine in a marine propulsion system provides the storage of several sets of numerical values in which each numerical value in each set is associated with a particular cylinder of the engine. In addition, each numerical value in each set represents the number of consecutive firing events experienced by each cylinder prior to the occurrence of a skip fire event. A numerical value of zero indicates continuous skip fire events for a particular cylinder and a numerical value equivalent to some predetermined maximum numerical value, such as 255, represents a continuous firing regime for the associated cylinder.

20 Claims, 4 Drawing Sheets

FIG. 2

| CYLINDER | CYLINDER SKIP FUNCTION | CYCLE 1 | CYCLE 2 | CYCLE 3 | CYCLE 4 | CYCLE 5 | CYCLE 6 | CYCLE 7 | CYCLE 8 | CYCLE 9 | CYCLE 10 | CYCLE 11 | CYCLE 12 | CYCLE 13 | CYCLE 14 | CYCLE 15 | CYCLE 16 | CYCLE 17 | CYCLE 18 | CYCLE 19 |
|---|---|---|---|---|---|---|---|---|---|---|---|---|---|---|---|---|---|---|---|---|
| 1 | 4 | FIRE | FIRE | FIRE | FIRE | . | FIRE | FIRE | FIRE | FIRE | . | FIRE | FIRE | FIRE | FIRE | . | FIRE | FIRE | FIRE | FIRE |
| 2 | 3 | FIRE | FIRE | . | FIRE | FIRE | FIRE | . | FIRE | FIRE | FIRE | . | FIRE | FIRE | FIRE | . | FIRE | FIRE | FIRE | FIRE |
| 3 | 2 | FIRE | FIRE | FIRE | . | FIRE | . | FIRE | FIRE | FIRE | . | FIRE | . | FIRE | FIRE | FIRE | . | FIRE | . | FIRE |
| 4 | 4 | FIRE | FIRE | FIRE | FIRE | FIRE | FIRE | FIRE | FIRE | FIRE | FIRE | FIRE | . | FIRE | FIRE | . | FIRE | FIRE | FIRE | FIRE |
| 5 | 3 | FIRE | FIRE | FIRE | . | FIRE | . | FIRE | FIRE | . | FIRE | FIRE | . | FIRE | FIRE | FIRE | FIRE | FIRE | FIRE | FIRE |
| 6 | 2 | FIRE | FIRE | . | FIRE | FIRE | FIRE | FIRE | FIRE | FIRE | . | FIRE | FIRE | FIRE | FIRE | . | FIRE | FIRE | FIRE | FIRE |
| 7 | 4 | FIRE | FIRE | FIRE | FIRE | FIRE | FIRE | FIRE | . | FIRE | FIRE | FIRE | FIRE | FIRE | FIRE | FIRE | FIRE | FIRE | FIRE | FIRE |
| 8 | 3 | FIRE | FIRE | FIRE | . | FIRE | FIRE | FIRE | FIRE | FIRE | FIRE | FIRE | . | FIRE | FIRE | FIRE | . | FIRE | FIRE | FIRE |

FIG. 3

| CYLINDER | CYLINDER SKIP FUNCTION | CYCLE 1 | CYCLE 2 | CYCLE 3 | CYCLE 4 | CYCLE 5 | CYCLE 6 | CYCLE 7 | CYCLE 8 | CYCLE 9 | CYCLE 10 | CYCLE 11 | CYCLE 12 | CYCLE 13 | CYCLE 14 | CYCLE 15 | CYCLE 16 | CYCLE 17 | CYCLE 18 | CYCLE 19 |
|---|---|---|---|---|---|---|---|---|---|---|---|---|---|---|---|---|---|---|---|---|
| 1 | 1 | FIRE | . | FIRE | . | FIRE | . | FIRE | . | FIRE | . | FIRE | . | FIRE | . | FIRE | . | FIRE | . | FIRE |
| 2 | 2 | FIRE | FIRE | . | FIRE | FIRE | . | FIRE | FIRE | . | FIRE | FIRE | . | FIRE | FIRE | . | FIRE | FIRE | FIRE | FIRE |
| 3 | 3 | FIRE | FIRE | FIRE | . | FIRE | FIRE | FIRE | . | FIRE | FIRE | FIRE | . | FIRE | FIRE | FIRE | . | FIRE | FIRE | FIRE |
| 4 | 1 | FIRE | . | FIRE | . | FIRE | . | FIRE | . | FIRE | . | FIRE | . | FIRE | . | FIRE | . | FIRE | . | FIRE |
| 5 | 2 | FIRE | FIRE | . | FIRE | FIRE | . | FIRE | FIRE | . | FIRE | FIRE | . | FIRE | FIRE | . | FIRE | FIRE | . | FIRE |
| 6 | 3 | FIRE | FIRE | FIRE | . | FIRE | FIRE | FIRE | . | FIRE | FIRE | FIRE | . | FIRE | FIRE | FIRE | . | FIRE | FIRE | FIRE |
| 7 | 1 | FIRE | . | FIRE | . | FIRE | . | FIRE | . | FIRE | . | FIRE | . | FIRE | . | FIRE | . | FIRE | . | FIRE |
| 8 | 2 | FIRE | FIRE | . | FIRE | FIRE | . | FIRE | FIRE | . | FIRE | FIRE | . | FIRE | FIRE | . | FIRE | FIRE | . | FIRE |

| CYLINDER | CYLINDER SKIP FUNCTION | CYCLE 1 | CYCLE 2 | CYCLE 3 | CYCLE 4 | CYCLE 5 | CYCLE 6 | CYCLE 7 | CYCLE 8 | CYCLE 9 | CYCLE 10 | CYCLE 11 | CYCLE 12 | CYCLE 13 | CYCLE 14 | CYCLE 15 | CYCLE 16 | CYCLE 17 | CYCLE 18 | CYCLE 19 |
|---|---|---|---|---|---|---|---|---|---|---|---|---|---|---|---|---|---|---|---|---|
| 1 | 0 | . | . | . | . | . | . | . | . | . | . | . | . | . | . | . | . | . | . | . |
| 2 | 1 | FIRE | . | FIRE | . | FIRE | . | FIRE | . | FIRE | . | FIRE | . | FIRE | . | FIRE | . | FIRE | . | FIRE |
| 3 | 2 | FIRE | FIRE | . | FIRE | FIRE | . | FIRE | FIRE | . | FIRE | FIRE | . | FIRE | FIRE | . | FIRE | FIRE | . | FIRE |
| 4 | 3 | FIRE | FIRE | FIRE | . | FIRE | FIRE | FIRE | . | FIRE | FIRE | FIRE | . | FIRE | FIRE | FIRE | . | FIRE | FIRE | FIRE |
| 5 | 0 | . | . | . | . | . | . | . | . | . | . | . | . | . | . | . | . | . | . | . |
| 6 | 1 | FIRE | . | FIRE | . | FIRE | . | FIRE | . | FIRE | . | FIRE | . | FIRE | . | FIRE | . | FIRE | . | FIRE |
| 7 | 2 | FIRE | FIRE | . | FIRE | FIRE | . | FIRE | FIRE | . | FIRE | FIRE | . | FIRE | FIRE | . | FIRE | FIRE | . | FIRE |
| 8 | 3 | FIRE | FIRE | FIRE | . | FIRE | FIRE | FIRE | . | FIRE | FIRE | FIRE | . | FIRE | FIRE | FIRE | . | FIRE | FIRE | FIRE |

*FIG. 4*

METHOD AND APPARATUS FOR CONTROLLING THE POWER OUTPUT OF A HOMOGENOUS CHARGE INTERNAL COMBUSTION ENGINE

BACKGROUND OF THE INVENTION

1. Field of the Invention

The present invention is generally related to a method and apparatus for controlling the power output of a homogeneous charge internal combustion engine and, more particularly, to a method and apparatus for controlling a skip charge firing technique relating to an engine with a manual throttle control mechanism.

2. Description of the Prior Art

Many types of skip fire techniques are known to those skilled in the art. For example, U.S. Pat. No. 5,553,575, which issued to Beck et al on Sep. 10, 1996, describes a Lambda control by skip fire of unthrottled gas fueled engines. The performance of a gas-fueled unthrottled internal combustion engine is improved by optimizing excess air ratio in the engine. Lambda (air ratio) is optimized by selecting automatically and continuously the optimum fraction of cylinders firing as a function of engine operating parameters, eliminating the fuel charge from one or more cylinders to obtain firing in the optimum fraction of cylinders firing, and distributing unused fuel to the optimum fraction of cylinders firing, thereby decreasing lambda in the firing cylinders to an optimum level. The optimum fraction of cylinders firing may be calculated according to mathematically derived and empirically weighted equations, or obtained with reference to suitable look-up tables. In addition, optimum lambda and optimum fraction of cylinders firing may be adjusted to take into account the effects of exhaust gas recirculation, engine speed, and/or engine timing. Further lambda adjustment can be performed by suitable control of exhaust gas recirculation, ignition timing, and/or turbo air bypass.

U.S. Pat. No. 5,778,858, which issued to Garabedian on Jul. 14, 1998, describes a fuel injection split engine. An automobile includes an engine and an engine controller. The engine includes multiply cylinders. Each cylinder has a fuel injector connected to the engine controller. The engine controller has a first output which activates a first fraction of the fuel injectors. In addition, the engine controller has a second output which activates a second fraction of the fuel injectors. The engine controller also as an input which provides a timing signal synchronous with rotation of the engine and a sequencing circuit responsive to the timing signal. The sequencing circuit periodically alternates between the first and second output in synchronization with the rotation of the engine.

U.S. Pat. No. 5,377,631, which issued to Schechter on Jan. 3, 1995, describes a skip cycle strategy for four cycle engines. Strategies for operating a four cycle engine in skip cycle manner include providing the engine with a valve control so that each intake and exhaust valve for each cylinder can be individually activated or deactivated essentially instantaneously to provide a skip cycle pattern that varies as a function of a load. Individual ones of the valves permit changing the purpose of the stroke off each piston of each deactivated cylinder for compression to exhaust or intake to expansion, as the case may be to assure firing of all of the engine cylinders within as short a period as one skip cycle to prevent cylinder cooldown, which promotes emissions. Unthrottled operation also is provided by closing the intake and exhaust valves in a particular sequence during skip cycle operation, and controlling the intake valve closure time during load periods between skip cycle periods to continue unthrottled operation for all load levels. Further individual activation or deactivation of the fuel injectors and spark plugs enhances the skip cycle, unthrottled operation.

U.S. Pat. No. 5,826,563, which issued to Patel et al on Oct. 27, 1998, describes a diesel engine cylinder skip firing system. A high horsepower diesel engine is operated in a skip firing mode in which the engine includes a plurality of individually controllable, fuel injected cylinders. The system senses that the engine is operating in a low horsepower mode and has a low fuel demand and therefore selects a firing pattern of cylinders to be fired during each revolution of the engine crankshaft based upon the values of the sensed fuel demand and engine horsepower. The pattern selected for firing the cylinders is arranged such that all cylinders of the engine are fired within a preselected number of crankshaft rotations. The system also senses the engine air-fuel ratio and adjusts the pattern of cylinders being fired so as to maintain exhaust emissions below a preselected level. Additionally, the pattern of fired cylinders may be adjusted to maintain engine operating temperature and as a function of engine speed.

U.S. Pat. No. 4,550,703, which issued to Ootuka et al on Nov. 5, 1985, describes a continuous method of fuel injection in electronically controlled engines. The minimum fuel injection time is on electronically controlled fuel injection engines and is set in relation to the running condition of the engine. For example, in shift change, when the throttle valve is in the idling angle and the revolution speed of the engine is high, the minimum fuel injection time is set to a small value to improve the efficiency of fuel consumption. Also, at the completion of fuel cut-off when the revolution speed of the engine is low, the minimum fuel injection time is set to a large value to improve the driveability of the vehicle.

U.S. Pat. No. 6,273,771, which issued to Buckley et al on Aug. 14, 2001, describes a control system for a marine vessel. The control system incorporates a marine propulsion system that can be attached to a marine vessel and connected in signal communication with a serial communication bus and a controller. A plurality of input devices and output devices are also connected in signal communication with a communication bus and a bus access manager, such as CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

The patents described above are hereby explicitly incorporated by reference in the description of the present invention.

Many situations can occur, particularly with regard to a marine propulsion system, wherein it is desirable to control the power output of an internal combustion engine independently of an operator controlled manual throttle control mechanism. For example, certain control systems monitor engine temperature and coolant flow and, if engine temperature is above allowable limits, it is desirable to limit the output power of the engine regardless of the control input received from a manually controlled throttle mechanism. Furthermore, during deceleration of a marine vessel propulsion system, it is often desirable to control the rate of deceleration within preselected magnitudes. Furthermore, it is often desirable to limit boat speed and engine speed independently from the input received from a manually controllable throttle mechanism.

If an internal combustion engine is operating in a stratified combustion mode, such as is the case with a direct fuel injected (DFI) fuel system, or makes use of an electronic throttle, engine speed control is easily accomplished. However, with an engine that is operating under a manual throttle control system and incorporates a homogeneous charge combustion mode, engine speed control is not easily accomplished independently from the manual throttle mechanism.

It would therefore be significantly beneficial if a system could be provided in which an internal combustion engine operating with a homogeneous charge could be controlled, with regard to power output, independently of a manual throttle control mechanism.

SUMMARY OF THE INVENTION

A method for controlling the power output of a homogenous charge internal combustion engine with a manual throttle control, within the scope of the present invention, comprises the steps of storing a plurality of sets of numerical values, determining a desired power output of the engine, measuring an actual power output of the engine, comparing the desired power output with the actual power output, selecting a selected one of the plurality of sets of numerical values, and selectively activating and deactivating each of a plurality of cylinders of the engine as a function of the selected one of the plurality of sets of numerical values.

Each set of numerical values is associated with a desired power output magnitude of the engine. Each set of numerical values comprises a plurality of numerical values, wherein each of the plurality of numerical values within each of the plurality of sets is associated with a specific one of a plurality of cylinders of the engine.

The selection of the selected one of the plurality of sets of numerical values is based on the relative magnitudes of the desired and actual power outputs, in a preferred embodiment of the present invention. The cylinders can be activated and deactivated by energizing and de-energizing either a spark plug associated with each cylinder or a fuel injector associated with each cylinder, or both.

The numerical values in each of the plurality of sets of numerical values each represent a number of consecutive firing cycles to be executed for an associated cylinder before a skip fire event occurs for that associated cylinder. The comparing and selecting steps can be performed by a proportional-integral-differential (PID) controller or other set-point controller.

In a particularly preferred embodiment of the present invention, the homogeneous charge internal combustion engine is a two cycle engine connected in torque transmitting association with a marine propulsion system. The homogeneous charge internal combustion engine can be a fuel injected engine.

BRIEF DESCRIPTION OF THE DRAWINGS

The present invention will be more fully and completely understood from a reading of the description of the preferred embodiment in conjunction with the drawings, in which:

FIGS. 2, 3, and 4 show three different sequences of firing and skip firing based on three different firing patterns.

DESCRIPTION OF THE PREFERRED EMBODIMENT

Figure 1:
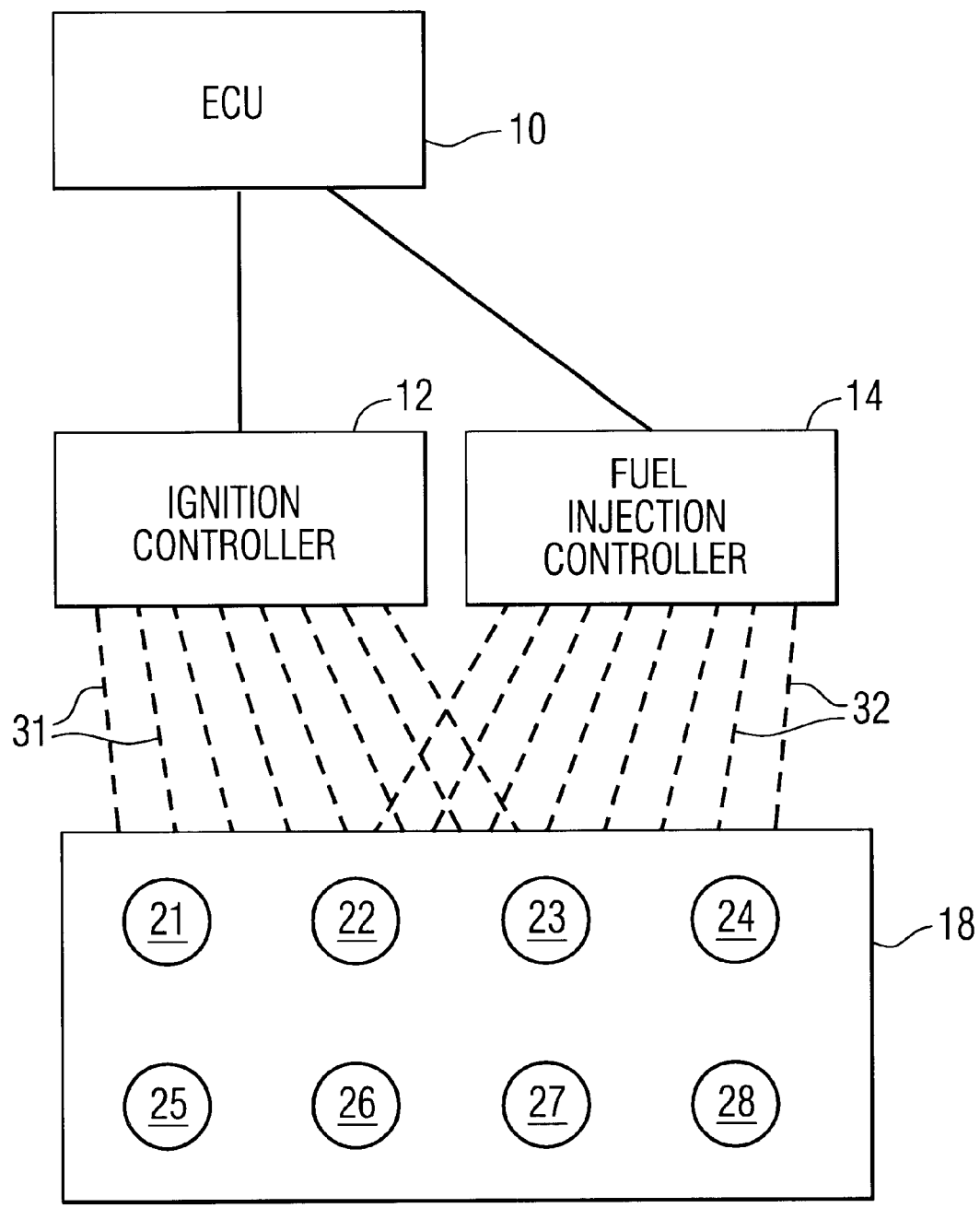
FIG. 1 is a schematic representation of an engine control system.

Throughout the description of the preferred embodiment of the present invention, like components will be identified by like reference numerals.

FIG. 1 is a highly schematic representation of a marine propulsion control system. An engine control unit 10 provides command signals to an ignition controller 12 and a fuel injection controller 14. The ignition controller 12 and fuel injection controller 14 can be software routines within a microprocessor of the engine control unit 10 which provide signals to the spark plug firing mechanisms and fuel injectors of the engine 18. The engine 18 comprises a plurality of cylinders 21–28 which are each associated with an individual spark plug and fuel injector or, alternatively, an individual ignition device and a carburetor.

The dashed lines shown in FIG. 1 extending between the ignition controller 12 and the engine 18 represent control lines associated with each ignition device, or spark plug. Dashed lines 32 are shown extending between the fuel injection controller 14 and the engine 18 and each of the dashed lines 32 represent a connection with a fuel injector. It should be understood that each of the cylinders 21–28 are associated with an individual spark plug and an individual fuel injector in the particular embodiment represented in FIG. 1.

It is often desirable to prevent one or more of the cylinders 21–28 from firing during any particular cycle of the engine 18. This is a known way of reducing the power output of the engine 18. As described above, several reasons can exist for reducing the power output of an engine. If a fault condition, such as an over temperature condition, is detected by the engine control unit 10, it may be desirable to limit the power output of the engine 18 in an attempt to prevent the engine temperature from increasing and causing damage. According to this technique, the engine 18 can be used to power a watercraft back to shore without overstressing the engine 18. Similarly, during deceleration of the engine, it can be beneficial if certain cylinders are preventing from firing during preselected cycles of the engine.

Although skip firing techniques are known to those skilled in the art, as described above, skip firing in association with a homogeneous charge engine and in association with a manually controlled throttle mechanism have not incorporated a dynamic control method in which the skip firing procedure is determined specifically as a function of the relative magnitudes of a desired power output and a measured actual power output of the engine.

With reference to FIGS. 2–4, the present invention provides an efficient method for regulating the power output of the engine 18 independently of a manual throttle control mechanism. In FIG. 2, numerical values are shown for each cylinder of an eight cylinder engine. The numerical values are in the column identified as "CYLINDER SKIP FUNCTION" and, as shown in FIG. 2, each numerical value is associated with a specific cylinder of the engine. The column of eight numerical values identified as the "CYLINDER SKIP FUNCTION" requires minimal storage in a microprocessor and accomplishes the required result of selecting a preferred power output of the engine based on the firing sequence and skip sequence identified by the numerical values.

With continued reference to FIG. 2, each number in the "CYLINDER SKIP FUNCTION" column represents the number of consecutive cycles during which the associated cylinder is fired normally prior to the skipping of a cycle for that cylinder. As an example, cylinder number 1 is fired during four consecutive cycles of the engine prior to the skipping of the ignition event for that cylinder number 1. This skipping event is then followed by four more firing events. For cylinder number 1, this pattern is repeated indefinitely until the "CYLINDER SKIP FUNCTION" is changed for that cylinder. This is represented in FIG. 1 where it shows four individual patterns, consisting of four consecutive firing events each, and separated by a skip fire event. The skip fire events occur in cycles 5, 10, and 15 in FIG. 2. It should be understood that this pattern would be continuously repeated until the numerical value for cylinder number 1 in the "CYLINDER SKIP FUNCTION" column is changed. Similarly, for cylinder number 2, the numerical value in the "CYLINDER SKIP FUNCTION" is "3" which indicates that three consecutive firing events will occur during three consecutive cycles of the engine before a skip fire event occurs. This cycle repeats as shown in FIG. 2 with cylinder number 2 experiencing a skip fire event during cycles 4, 8, 12, and 16.

With continued reference to FIG. 2, it can be seen that the eight cylinders are each provided with an individual numerical value in the "CYLINDER SKIP FUNCTION" column and each numerical value represents the number of consecutive firing events for that cylinder prior to a skip cycle event. For purposes of describing the present invention, it will be assumed that the instantaneous power output of the eight cylinder engine is determined as a function of the number of cylinders firing during each cycle of the engine. For example, during the first two cycles shown in FIG. 2, all cylinders are fired. This would result in a 100% instantaneous power output which is equivalent to the total maximum power output of the engine as a result of the position of the manually controlled throttle mechanism. In other words, the power output requested by the operator remains unaffected during the first two cycles shown in FIG. 2. However, cycle 3 shows two cylinders experiencing a skip fire event. Six of the eight cylinders are fired to result in 75% of the commanded power output of the engine occurring during the third cycle. Cumulatively, during the first three cycles in FIG. 2, the number of firing events compared to the total number of possible firing events results in 91.7% of the total manually commanded power output of the engine actually being delivered by the engine. Since cycle 4 shows three skip fire events, for cylinders 2, 5, and 8. 62.5% of the possible power is instantaneously provided during cycle 4 by the engine. This same percentage of commanded output power is also provided during cycle 5. Cumulatively, as the engine continues to run, the total power provided under the conditions represented in FIG. 2 is approximately 75% to 80% of the total power commanded by the manually operated throttle mechanism.

FIG. 3 shows an alternative firing pattern identified by the numerical value shown in the "CYLINDER SKIP FUNCTION" column for each of the eight cylinders. According to the same rules described above, each number in the "CYLINDER SKIP FUNCTION" represents the number of consecutive firing cycles for each cylinder which precede a skip fire cycle. If the numerical value is "1", a single firing cycle precedes a skip cycle as shown. Similarly, the numerical value "2" represents two consecutive firing cycles which precede a skip cycle. These individual cylinder-specific firing sequences are repeated indefinitely until the numerical values are changed. Over time, the "CYLINDER SKIP FUNCTION" shown in FIG. 3 result in an engine power output that is between 62% and 66% of the commanded output power represented by the position of the manually control throttle mechanism.

FIG. 4 shows a third set of numerical values in the "CYLINDER SKIP FUNCTION" column. It should be noted that the zero numerical value represents the continuous skipping of the associated cylinder. Since cylinders 1 and 5 have a zero in the "CYLINDER SKIP FUNCTION" column, no firing events occur with respect to those cylinders. The other six cylinders are fired and skipped based on the basic algorithm described above and in conjunction with FIGS. 2 and 3. The firing pattern represented in FIG. 4 results in a power output between 47% and 50% of the commanded power output represented by the position of the manually controlled throttle mechanism.

Figure 5:
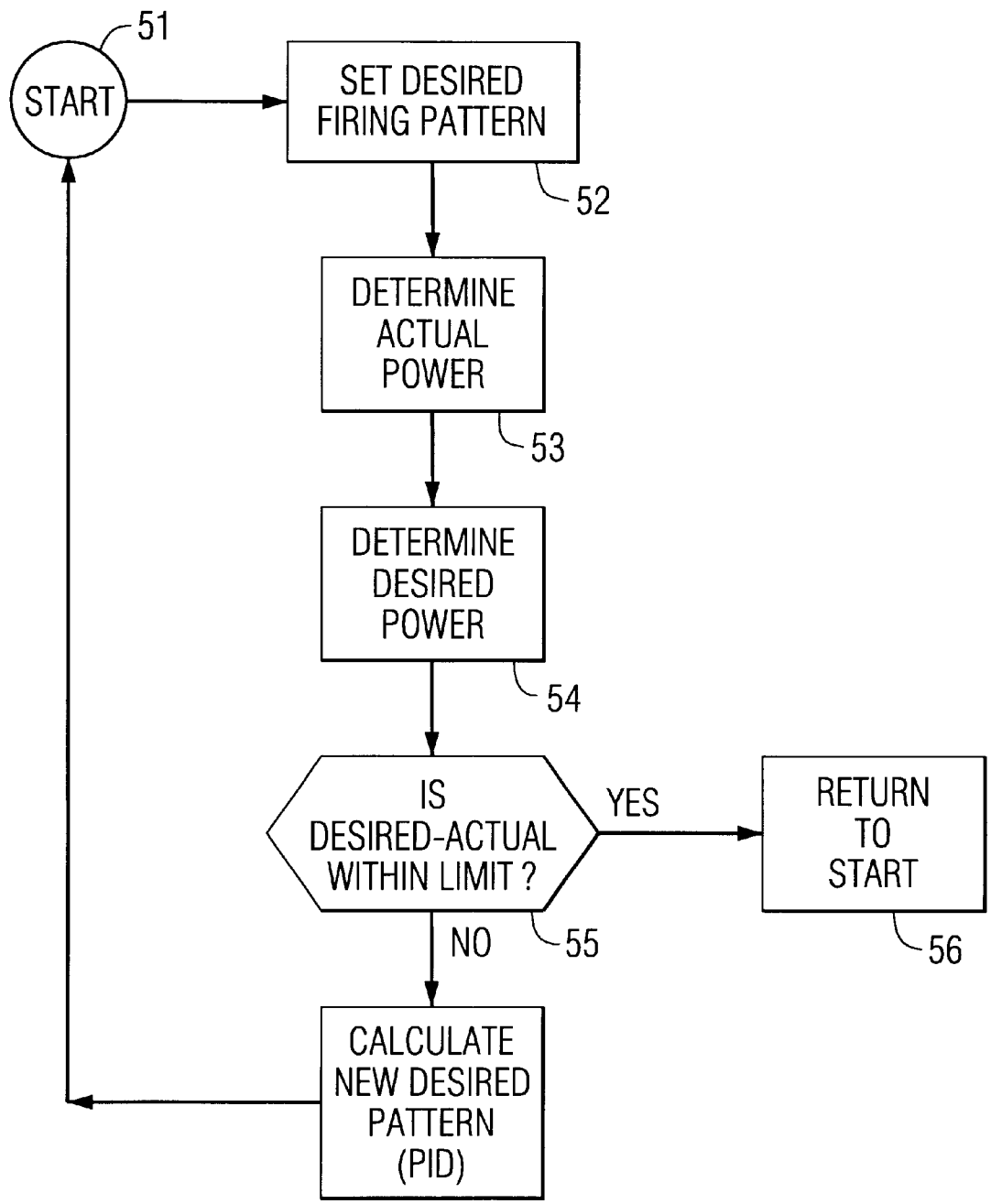
FIG. 5 is a flow chart representing an algorithm which can perform the method of the present invention.

FIG. 5 is a flow chart representing an algorithm that can be used to perform the method of the present invention. From a starting point, at functional block 51, the desired firing pattern is implemented at functional block 52. This implementation can comprise the storing of a particular firing pattern in a particular variable within a microprocessor. The desired firing patterns can be those represented in the "CYLINDER SKIP FUNCTION" columns of FIGS. 2, 3, or 4 or any other group of numerical values in which each numerical value is associated with a particular cylinder of the engine. Functional block 53 shows the method determining the actual power provided by the engine. This determination can be made in several different ways. Since power is a function of torque and engine speed, and torque is a function of the air provided to each cylinder during each cycle of the engine, the power provided by the engine can be determined as a function of the air provided to each cylinder. The mass air flow provided to each cylinder can be measured by a mass air flow sensor or a hot wire anemometer. Alternatively, it can be calculated as a function of the manifold absolute pressure P, the cylinder volume V swept during each cycle of the engine, the ideal gas constant R, the manifold air temperature T, the volumetric efficiency $\eta_v$ as shown in equation 1 below:

$$m=(PV/RT)\eta_v \quad (1)$$

Whether the air charge per cylinder (APC) is determined empirically or calculated, it allows the algorithm to determine the torque provided during each cycle event. The engine speed (RPM) can be measured by a tachometer and used, in conjunction with the torque value to determine the output power of the engine.

The desired power is determined at functional block 54 in FIG. 5. The desired power can be selected as a function of several different variables. The operating condition of the engine can be determined to be suboptimal because of a measured variable, such as temperature, that is not within appropriate threshold values or any other method of determination. Once the desired power output of the engine is determined at functional block 54, the actual power and desired power can be compared at functional block 55. If the desired and actual power magnitudes are within a prescribed limit or tolerance, the algorithm shown in FIG. 5 returns to the starting point 51, as identified at functional block 56. If the actual power output is not within the prescribed tolerance of the desired power output, a new desired pattern is calculated by using the proportional-integral differential (PID) controller described above. The new desired pattern is then set, as described above in conjunction with functional block 52, after the algorithm returns to the starting point 51. In this way, the continual measuring of actual power allows the result to be compared to a desired power output magnitude and the control method can adjust the firing pattern to accomplish the desired result of providing an output power equal to the desired power determined at functional block 54.

As an example, a temperature condition may dictate that a power output should be limited to 50% of a certain magnitude, such as the commanded output indicated by the position of the manually controlled throttle control mechanism. If the measured actual power at functional block 53 indicates that the actual power provided by the engine is 60% of the manually selected magnitude, the PID controller can reselect a different set of numerical values in response to this difference between the actual and desired power output magnitudes. A particular methodology used by the PID controller to select from the plurality of sets of numerical values is not limiting to the present invention.

The present provides a method for controlling an engine in which two or more firing patterns are stored, as sets of numerical values in which each numerical value in each set corresponds to an individual cylinder of the engine and represents the number of consecutive firing events for that cylinder prior to a skip fire event.

It should be understood that the skip fire event can be accomplished by either preventing electrical power from being connected to a spark plug for that cylinder or, alternatively, by preventing a fuel injection event for that cylinder from occurring. It should also be understood that the skip fire event can be caused by both depriving the spark plug of electrical power and by eliminating the fuel injection event associated with that particular cylinder.

Although the present invention can be used in conjunction with any type of internal combustion engine, it is particularly useful in conjunction with a marine propulsion system, such as an outboard motor or sterndrive system, in which the method of the present invention is used to cause the engine to provide a power output less than the output demanded by the operator of the marine vessel. It also allows a plurality of optional power outputs to be selected by the PID controller. This is accomplished by storing a plurality of sets of numerical values as described above in which each set of numerical values is associated with a particular power output percentage. The PID controller can then select from the repertoire of stored sets of numerical values to dynamically adjust the operation of the engine and dynamically select the power output of the engine.

Although the present invention has been described with particular detail and illustrated to show one particularly preferred embodiment, it should be understood that alternative embodiments are also within its scope.

We claim:

1. A method for controlling the power output of an internal combustion engine with a manual throttle control, comprising the steps of:
   providing a homogeneous air/fuel charge originating at a location external to a plurality of cylinders of said engine;
   storing a plurality of sets of numerical values, each set of numerical values being associated with a desired power output magnitude of said engine and comprising a plurality of said numerical values, each of said plurality of numerical values within each of said plurality of sets being associated with a specific one of said plurality of cylinders of said engine;
   determining a desired power output of said engine;
   measuring an actual power output of said engine;
   comparing said desired power output with said actual power output;
   selecting, based on the relative magnitudes of said desired and actual power outputs, a selected one of said plurality of sets of numerical values; and
   selectively activating and deactivating each of said plurality of cylinders of said engine as a function of said selected one of said plurality of sets of numerical values.

2. The method of claim 1, wherein:
   said selectively activating and deactivating step comprises the step of selectively energizing and de-energizing a spark plug associated with each of said plurality of cylinders of said engine as a function of said selected one of said plurality of sets of numerical values.

3. The method of claim 1, wherein:
   said selectively activating and deactivating step comprises the step of selectively energizing and de-energizing a fuel injector associated with each of said plurality of cylinders of said engine as a function of said selected one of said plurality of sets of numerical values.

4. The method of claim 1, further comprising:
   repeating said actual power output measuring step and said comparing step until said actual power output is within a preselected margin of magnitude of said desired power output.

5. The method of claim 1, wherein:
   each of said numerical values in each of said plurality of sets of numerical values represents a number of consecutive firing cycles to be executed for an associated cylinder before a skip fire event occurs for that associated cylinder.

6. The method of claim 1, wherein:
   said comparing step is performed by a PID controller.

7. The method of claim 6, wherein:
   said comparing and selecting steps are performed by said PID controller.

8. The method of claim 1, wherein:
   said homogeneous charge internal combustion engine is connected in torque transmitting association with a marine propulsion system.

9. The method of claim 1, wherein:
   said homogeneous charge internal combustion engine is a two cycle engine.

10. The method of claim 1, wherein:
    said homogeneous charge internal combustion engine is a fuel injected engine.

11. Apparatus for controlling the power output of an internal combustion engine with a manual throttle control, comprising:
    means for providing a homogeneous air/fuel charge originating at a location external to a plurality of cylinders of said engine;
    means for storing a plurality of sets of numerical values, each set of numerical values being associated with a desired power output magnitude of said engine and comprising a plurality of said numerical values, each of said plurality of numerical values within each of said plurality of sets being associated with a specific one of said plurality of cylinders of said engine;
    means for determining a desired power output of said engine;
    means for measuring an actual power output of said engine;
    means for comparing said desired power output with said actual power output;

means for selecting, based on the relative magnitudes of said desired and actual power outputs, a selected one of said plurality of sets of numerical values; and means for selectively activating and deactivating each of said plurality of cylinders of said engine as a function of said selected one of said plurality of sets of numerical values.

12. A method for controlling the power output of an internal combustion engine with a manual throttle control, comprising the steps of:

providing a homogeneous air/fuel charge originating at a location external to a plurality of cylinders of said engine;

storing a first set of numerical values, each of said numerical values within said first set of numerical values being associated with an associated one of a plurality of cylinders of said engine, said first set of numerical values being associated with a first desired power output of said engine;

storing a second set of numerical values, each of said numerical values within said second set of numerical values being associated with an associated one of said plurality of cylinders of said engine, said second set of numerical values being associated with a second desired power output of said engine;

determining a desired power output of said engine;

selecting a preferred one of said first and second sets of numerical values; and selectively activating and deactivating each of said plurality of cylinders of said engine as a function of said preferred one of said first and second sets of numerical values.

13. The method of claim 12, further comprising:

measuring an actual power output of said engine; and comparing said desired power output with said actual power output.

14. The method of claim 13, wherein:

said selecting step is based on the relative magnitudes of said desired and actual power outputs.

15. The method of claim 14, wherein:

said selectively activating and deactivating step comprises the step of selectively energizing and de-energizing a spark plug associated with each of said plurality of cylinders of said engine as a function of said selected one of said first and second sets of numerical values.

16. The method of claim 14, wherein:

said selectively activating and deactivating step comprises the step of selectively energizing and de-energizing a fuel injector associated with each of said plurality of cylinders of said engine as a function of said selected one of said first and second sets of numerical values.

17. The method of claim 14, further comprising:

repeating said actual power output measuring step and said comparing step until said actual power output is within a preselected margin of magnitude of said desired power output.

18. The method of claim 12, wherein:

each of said numerical values in said first and second sets of numerical values represents a number of consecutive firing cycles to be executed for an associated cylinder before a skip fire event occurs for that associated cylinder.

19. The method of claim 18, wherein:

said comparing step is performed by a PID controller.

20. The method of claim 18, wherein:

said homogeneous charge internal combustion engine is a two cycle fuel injected engine connected in torque transmitting association with a marine propulsion system.

* * * * *